Patented May 29, 1951

2,554,484

UNITED STATES PATENT OFFICE 2,554,484

PREPARATION OF CYANOALKENES

Donald J. Loder, Wilmington, Del., assignor to E. I. du Pont de Nemours and Company, Wilmington, Del., a corporation of Delaware No Drawing. Application June 17, 1950, Serial No. 168,845

6 Claims. (Cl. 260—465.9)

This invention relates to a novel process for manufacturing cyanoalkenes. More particularly, this invention is directed to a process for preparing acrylonitrile and methacrylonitrile by oxidation of propionitrile and isobutyronitrile respectively.

For many years it has been known that acrylonitrile can be prepared by dehydrogenating propionitrile in the presence of such catalysts as metals of groups II to VII of the periodic table, magnesium oxide, zinc oxide, aluminum oxide, titanium oxide, vanadium oxide, chromium oxide, molybdenum oxide, manganese oxide, and the sulfates, silicates, and phosphates of these metals or mixtures of these catalysts, as well as combinations of such catalysts with supports such as silica gel, pumice, and decolorizing clays. Instead of the oxides, compounds which give rise to the formation of these oxides under the reaction conditions, such as the hydroxides and carbonates, also have been known to be active catalysts for the dehydrogenation of saturated nitriles. It was also known that this process could be carried out at reduced pressures, and that the effects of reducing the pressure could also be realized by employing a carrier gas such as a volatile hydrocarbon, acetonitrile, nitrogen, trace quantities of air, or carbon dioxide. Carbon dioxide was known to have a specific beneficial effect upon the process by preventing the formation of carbon on the surface of the catalyst. These disclosures are found in French Patent 790,262 (délivré September 2, 1935). More recently (in U. S. Patent 2,385,552) it has been disclosed that greatly increased yields of unsaturated nitriles can be obtained by dehydrogenation of saturated nitriles by the use of a catalyst comprising the dark vitreous oxide of a metal from the group consisting of chromium and vanadium. With these specific catalysts yields as high as 85% were reported at conversions of about 30%. It has also been reported that, in the dehydrogenation of propionitrile, pyrolysis to HCN can be avoided by employing tungsten sulfide and a minor proportion of nickel sulfide as catalyst (U. S. 2,452,505).

In general, the available processes for dehydrogenating saturated nitriles have had the serious disadvantage that the activity of the catalyst decreases fairly rapidly after a few hours of operation, so that the high yields which are initially obtainable cannot be maintained for sufficiently long periods of time to make the said processes economically attractive. An even more serious disadvantage, from the standpoint of the manufacture of acrylonitrile or methacrylonitrile on a large scale, has been the high requirement for heat input, which limited the size of the equipment which could be employed satisfactorily. Another serious inherent disadvantage in the aforesaid processes has been the limitation on conversion which is imposed by thermodynamic considerations; the dehydrogenation is unfavorable thermodynamically except at very high temperatures, and as a result at the lower temperatures within the operable range the conversion is limited to about 25% to 35%. Even when these maximum conversions are obtained, the activity of the catalyst falls off too rapidly.

An object of this invention is to overcome the aforesaid disadvantages of the previously known processes for preparing unsaturated nitriles from saturated nitriles. A more specific object of the invention is to provide an economically feasible process for converting propionitrile to acrylonitrile. A still further object of the invention is to provide a process for making acrylonitrile in high yield and of sufficiently high quality to permit use thereof in the manufacture of polyacrylonitrile textiles. These objectives are attained by the process set forth.

It has been discovered in accordance with this invention that unsaturated nitriles, e. g. cyanoalkenes, can be prepared by oxidation of saturated nitriles (e. g. cyanoalkanes). In novel method of the present invention, the unsaturated nitrile is formed primarily by oxidation of the saturated nitrile, i. e. the chief source of the unsaturated nitrile is the reaction involving reaction of oxygen with the saturated nitrile. It has also been discovered in accordance with this invention that compounds of the formula $H_2C=CRCN$, R being a member of the class consisting of hydrogen and methyl groups, can be prepared by oxidizing compounds of the formula $CH_3CHRCN$ with from 0.1 to 2.0 mols of free oxygen per mol of nitrile at a temperature within the range of 250° to 900° C., preferably about 400° to 750° C. Temperatures as high as 1,000° C. or higher may be employed if the space velocity is very high.

An important advantage of the present invention lies in the elimination of the need for supplying heat to compensate for the endothermicity of the dehydrogenation reaction. Furthermore, the oxidation of saturated nitriles to unsaturated nitriles is much more favorable from a thermodynamic standpoint than is the previously known dehydrogenation reaction, and accordingly much higher conversions can be obtained at relatively lower temperatures than in the previously known process.

The oxidation reaction of the present invention takes place in the presence of oxidation catalysts, including chromium oxide, molybdenum oxide, copper oxide, etc. Substances which are capable of initiating desired chain reactions also may be present. These include monohydric phenols, polyhydric phenols, benzene, naphthalene, anthracene, urethane, higher alkanes, ethers, aldehydes, ketones, nitro compounds, oxides of nitrogen, sulfur, sulfur oxides, hydrogen-cyanide, peroxy compounds, etc. The oxidation also takes place quite readily in quartz converters in the absence of catalysts from an external source. Moreover, all of the previously known catalysts which are effective for the dehydrogenation of propionitrile to acrylonitrile (hereinabove described) are active in the oxidation reaction of this invention. With many of these previously known dehydrogenation catalysts the oxidative dehydrogenation takes place too vigorously, and it is therefore preferred to employ relatively mild dehydrogenation catalysts. A highly effective group of relatively mild catalysts is the class consisting of metals of group Ib of the periodic table (copper, silver, gold) and oxides thereof. Silica gel and boric oxide-silica gel may also be used. Zinc metaphosphate also is effective. Other suitable catalysts are hereinafter disclosed and illustrated.

The saturated nitrile which is employed in the practice of the invention may be produced in situ by thermal or catalytic dehydration of propionamide or isobutyramide, but it is generally preferred to introduce the saturated nitrile into the reaction vessel as such. An excellent way of carrying out the oxidation is to introduce a mixture of the nitrile and corresponding amide, whereby a mixture of the saturated nitrile (which can be recycled) and the desired unsaturated nitrile is obtained.

The invention may be illustrated further by means of the following examples:

*Example 1.*—Propionitrile containing 2% by weight of hydrogen bromide was passed through a quartz tube with air (mol ratio of propionitrile:oxygen=1:0.467) at a total space velocity of 650, the maximum temperature being 533° C. The conversion of propionitrile to acrylonitrile was 7%.

Note: In the absence of oxygen virtually no acrylonitrile is formed at this relatively low temperature.

*Example 2.*—Propionitrile containing 2% by weight of phenol was passed through a quartz tube with air (mol ratio of propionitrile:oxygen=1:0.49) at a total space velocity of 325, the maximum temperature being 535° C. Conversion to acrylonitrile was 7%; 88.3% of the propionitrile was recovered unchanged.

*Example 3.*—In a series of experiments, propionitrile was passed with air over granular solid catalysts under the conditions set forth in the table given below. The yields given are on the basis of propionitrile consumed.

| Run No. | 1 | 2 | 3 | 4 | 5 | 6 | 7 | 8 |
|---|---|---|---|---|---|---|---|---|
| Catalyst | 0.2% CoO on Tabular $Al_2O_3$ | Copper Wire | 10% $H_3BO_3$ on Tabular $Al_2O_3$ | 20% $Zn(PO_3)_2$ on SiO | Ag on SiC | Au on SiC | Au on SiC | Gold Foil |
| Total Space Velocity (cc. gas, N. T. P./cc. reaction zone/hr.). | 86,000 | 3,300,000 | 685 | 510 | 25,000 | 25,000 | 15,000 | 16,000 |
| $O_2$/Propionitrile Feed Mol Ratio. | .16 | .189 | .457 | .50 | 0.5 | 0.5 | 0.5 | 0.5 |
| Temperature, °C | 660°, inlet; 725°, max. | 565°, inlet; 690°, max. | 612° | 632° | 670° | 656° | 670° | 621° |
| Total Propionitrile Conv. | 8.5 | 11.9 | 16.2 | 17.9 | 16 | 10 | 22 | 13 |
| Conversion Propionitrile to Acrylonitrile. | 5.3 | 6.7 | 9.0 | 11.9 | 9 | 5 | 12 | 10 |
| Yield Propionitrile to Acrylonitrile. | 63 | 56 | 56 | 67 | 56 | 55-60 | 55 | 70 |

*Example 4.*—Propionitrile was passed with air (mol ratio, propionitrile:$O_2$, 1:0.5) through an otherwise empty quartz tube in the absence of any externally supplied catalyst, at a space velocity of 600, and a maximum temperature of 610° C. Conversion of propionitrile was 15%, and the yield of acrylonitrile was 49.8% of the theoretical.

*Example 5.*—A mixture consisting of propionitrile and oxygen (mol ratio 4:1) was passed into an open quartz tube at a temperature of 425° C., whereby an exothermic reaction occurred. The effluent product was a mixture of water, acrylonitrile and propionitrile.

*Example 6.*—A catalyst was prepared by washing 200 cc. silica gel granulates with nitric and hydrochloric acids, igniting the washed gel granules (screened, 14 to 30 mesh/in.), impregnating the granules by introducing a solution of 10 grams $Cd(NO_3)_2$ and 10 grams $UO_2(NO_3)_2 \cdot 6H_2O$ in 500 cc. distilled water and applying a vacuum thereto, decanting the liquid, and drying the impregnated granules at 100° C. This catalyst was packed into a coiled glass tube, which was immersed in a Woods metal bath at a temperature of 260° C. Propionitrile and air were passed through this coil at space velocities of 51 and 183 respectively. The liquid product was condensed from the effluent gas and distilled, yielding a small amount (1.6% conversion) of acrylonitrile.

*Example 7.*—A catalyst was prepared by washing 300 cc. silica gel powder (screened, 100 to 200 mesh/in.) with nitric and hydrochloric acids, igniting the washed silica gel, impregnating it by introducing a solution of 24 grams $UO_2(NO_3)_2$ in 1 liter of distilled water and applying a vacuum, decanting the liquid, drying the impregnated powder at 100° C., and screening it through a 48 mesh/in. screen. The fines were placed above chipped quartz packing in a glass tubular reaction vessel two feet long, having an inside diameter of 51 mm. At the top of the reaction vessel there was a tube for withdrawal of the gaseous reaction mixture. Air was injected at the bottom of the reaction vessel at the rate of 6 cu. ft. per hour; this produced a boiling bed of catalyst, 7.5 inches deep. Into the boiling bed, having a temperature of 448° C. to 497° C., was injected propionitrile vapor (47.5 g.) at a space velocity of 86. The effluent vapors were passed through a condenser, and the escaping gas was analyzed. This gas contained 4.7% $CO_2$, 6.0% $O_2$, 4.0% CO, the remainder being $N_2$. The liquid condensate contained 26.2 grams of upper layer and 7.3 grams of lower layer. Distillation of the upper layer gave 8 cc. of a fraction, B. P. 80° C. to 90° C., which contained acrylonitrile. The acrylonitrile content of the upper layer of the liquid product was 36.0% by chemical analysis. This corresponds to a conversion of propionitrile to acrylonitrile of 20.6%.

*Example 8.*—A mixed feed containing propionamide dissolved in propionitrile (wt. ratio 1:1) was passed with air (mol ratio mixed propionamide-propionitrile:oxygen=1:0.75) through a quartz tube containing a spiral of copper wire, at a total space velocity of 3 x $10^6$, the maximum temperature being 630° C. The conversion (based on propionamide) to acrylonitrile was 16% and to propionitrile 12%.

*Example 9.*—Propionamide containing 1% by weight of diphenylamine was passed through a quartz tube with air (37 grams propionamide, 26 liters of air; time, 109 minutes) at 634° to 656° C. Distillation of the resulting product gave a distillate containing 23.7 grams of upper layer and 7.0 grams of lower layer, and a pot residue (propionamide) weighing 6.3 grams. The top layer analyzed as follows: 21.8 grams propionitrile, 0.97 gram acrylonitrile, 0.13 gram acetonitrile, 0.07 gram HCN, 0.26 gram $H_2O$, 0.03 gram isobutyronitrile, 0.03 gram methacrylonitrile; the bottom layer was chiefly water, containing 0.3 gram propionitrile.

*Example 10.*—Into a pyrex converter equipped with an inlet tube at the top and an exit tube at the bottom was placed 10 cc. of chromium oxide-molybdenum oxide-on-aluminum oxide catalyst, supported on a bed of crushed quartz. This catalyst formed a layer about 0.5 in. thick. The catalyst bed was heated to 470° C. while a slow current of air was passed therethrough. Propionitrile was dropped into the catalyst zone, at the rate of 60 drops per minute. The exit gases were passed through a condenser then through a Dry Ice trap. As the oxidation progressed the temperature increased to 500° C. without addition of external heat. After an hour of operation under these conditions, the uncondensed exit gas analyzed 6.9% $CO_2$, 0.3% $O_2$, and 5.4% CO. The condensed product weighed 90 grams, 7.6 grams of which was acrylonitrile, the remainder of the condensate being at least about 90% propionitrile.

*Example 11.*—Repetition of Example 10 using isobutyronitrile in place of propionitrile gives a similar result, except that the product obtained is methacrylonitrile in place of acrylonitrile.

It is to be understood that the foregoing examples are illustrative only, and that the invention is not limited thereto. Any convenient method may be employed for separating the product obtained in the practice of the invention. Since water is invariably one of the products it may be removed by azeotropic distillation or by the use of a dehydrating agent. The acrylonitrile or methacrylonitrile fraction is readily obtainable by distillation of the product after dehydration. The impurities, which may also be removed by distillation, include small amounts of acetonitrile.

It has been found that isobutyronitrile and methacrylonitrile are apparently also formed in trace amounts during the oxidation of propionitrile by the method herein disclosed. The mechanism whereby these by-products may be formed is not necessarily understood. Also, in the oxidation of isobutyronitrile one of the products is acrylonitrile, which may be formed by a demethanation mechanism.

Inert diluents such as nitrogen, carbon dioxide, etc., may be present during the oxidation if desired. Accordingly the oxygen may be introduced into the reaction vessel in the form of oxygen-nitrogen mixtures, such as air, oxygen-carbon dioxide mixtures, or pure oxygen. A suitable quantity of oxygen is about 0.4 to 1.0 mols per mol of saturated nitrile charged, but a smaller amount is somewhat preferable if no inert diluent gas is present. The oxygen may be introduced at more than one point along the reaction vessel if desired, thus eliminating a large excess thereof near the inlet of the reaction vessel.

The only limitations which should be imposed are those which are indicated in the following claims.

I claim:

1. The method for preparing a cyanoalkene wherein the said cyanoalkene is produced primarily by oxidizing a cyanoalkane in the vapor phase with molecular oxygen.

2. The process of claim 1 in which the cyanoalkane is propionitrile and the cyanoalkene is acrylonitrile.

3. The process of claim 1 in which the cyanoalkane is isobutyronitrile and the cyanoalkene is methacrylonitrile.

4. A process for preparing acrylonitrile wherein the acrylonitrile is formed primarily by oxidizing propionitrile in the vapor phase with molecular oxygen in the presence of a chromium oxide-molybdenum oxide-on-aluminum oxide catalyst.

5. The method of claim 4 in which the temperature is within the range of 250° to 900° C.

6. The method of claim 5 in which the temperature is within the range of 400° to 750° C.

DONALD J. LODER.

REFERENCES CITED

The following references are of record in the file of this patent:

UNITED STATES PATENTS

| Number | Name | Date |
|---|---|---|
| 2,384,737 | Haas | Sept. 11, 1945 |
| 2,385,552 | Spence et al. | Sept. 25, 1945 |
| 2,412,437 | Wagner | Dec. 10, 1946 |
| 2,445,693 | Porter et al. | July 20, 1948 |
| 2,452,505 | Teter | Oct. 26, 1948 |
| 2,481,826 | Cosby | Sept. 13, 1949 |
| 2,499,055 | Cosby et al. | Feb. 28, 1950 |

FOREIGN PATENTS

| Number | Country | Date |
|---|---|---|
| 790,262 | France | Nov. 16, 1935 |